June 10, 1969  J. J. ANGELUCCI  3,448,781
MOTOR DRIVEN RECIPROCATING SAW HAVING ROTATABLE BLADE
Filed Oct. 21, 1966

INVENTOR
J. J. ANGELUCCI
BY MARN & JANGARATHIS
ATTORNEY

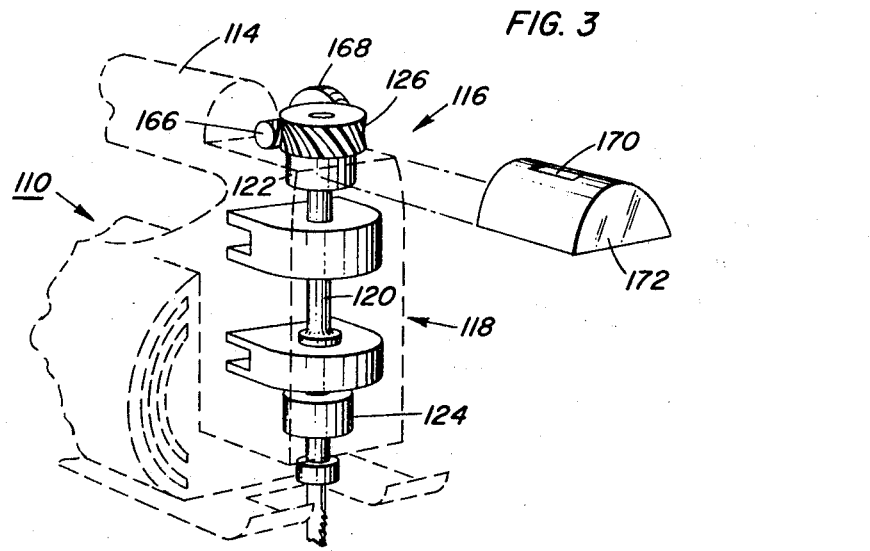
FIG. 3
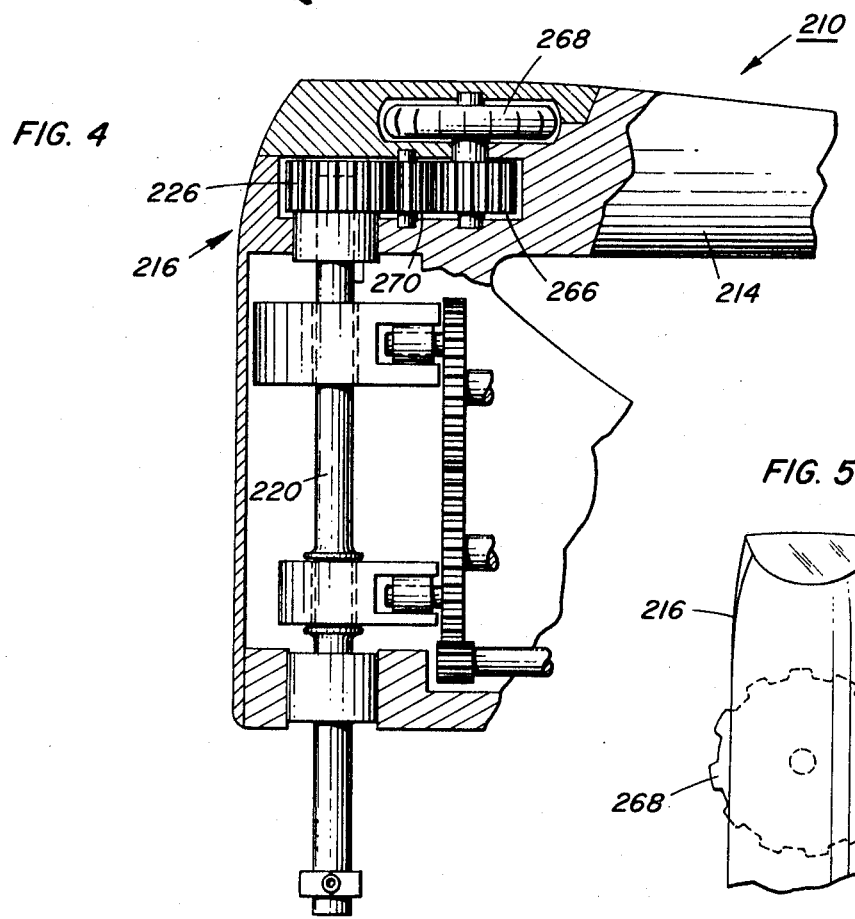
FIG. 4
FIG. 5

United States Patent Office 3,448,781
Patented June 10, 1969

3,448,781
MOTOR DRIVEN RECIPROCATING SAW HAVING ROTATABLE BLADE
John J. Angelucci, 359 10th Ave., Bethlehem, Pa. 18078
Filed Oct. 21, 1966, Ser. No. 588,394
Int. Cl. B27b 11/00
U.S. Cl. 143—68      4 Claims

ABSTRACT OF THE DISCLOSURE

A motor driven hand saw of the type having a sabre type blade mounted on a reciprocating shaft is provided with gearing on and in operative relation with the reciprocating shaft so that the cutting angle of the sabre type blade can be varied while the saw is engaged in a cutting operation. The gearing is positioned in such a manner as to allow the saw to be held and the blade selectively rotated by a single hand of an operator, thus freeing the other hand of the operator to grip the piece being cut.

---

This invention relates generally to motor driven saws and, more particularly, to motor driven hand saws of the type having a reciprocating, sabre type blade.

One of the most difficult techniques in using sabre saws of the known types has been that of cutting along a nonlinear or random path. A sabre saw operator is often called upon to accomplish circular cutting, contour cutting, cutting to relatively sharp angles, and cutting to random forms. Generally, this type of cutting requires an operator to manipulate the entire motor driven hand saw since ordinary sabre saws are restricted to being able to cut only in a plane containing the major axis of the saw housing. Such manipulation is often impossible particularly where cutting must be accomplished adjacent corners or walls which restrict the freedom of motion of both the operator and his tool.

The problem has been recognized and sabre saws have been designed which allow rotation of a sabre saw about the longitudinal blade axis. For the most part, however, these devices have not been satisfactory in that they often are not operable during the use of the tool and they require two hands for operation, thus precluding use of the device in the absence of additional means for securing the workpiece.

Accordingly, it is an object of this invention to provide a sabre saw wherein the saw blade is rotatable about its longitudinal axis during the operation of the saw and in response to a one-handed manipulation by the operator.

Another object of the present invention is the provision of a sabre saw wherein the saw blade is rotatable around its longitudinal axis, the rotation being imparted by a fingertip disc located in such proximity to the handle of the sabre saw that the saw can be held and the blade rotated using only one hand.

A still further object of the present invention is the provision of a sabre saw wherein the saw blade is rotatable around its longitudinal axis, the rotation being imparted by manipulating the grip of the sabre saw handle.

According to the present invention, the foregoing and other objects are attained by providing a hand held, motor driven sabre saw with a support-hand operated mechanism operatively connected to the saw blade driving mechanism to rotate the saw blade driving mechanism selectively during operation of the sabre saw.

The exact nature of this invention as well as other objects and advantages thereof will be readily apparent from a consideration of the following specification relating to the anexed drawings in which:

FIG. 3 is a sectional view of the forward end of the housing of a sabre saw wherein a second embodiment of the invention is utilized;

FIG. 4 is a sectional view of the forward end of the housing of a sabre saw wherein yet a third embodiment of the invention is utilized; and FIG. 5 is a partial top view of the embodiment of the sabre saw shown in FIG. 4.

Figure 1:
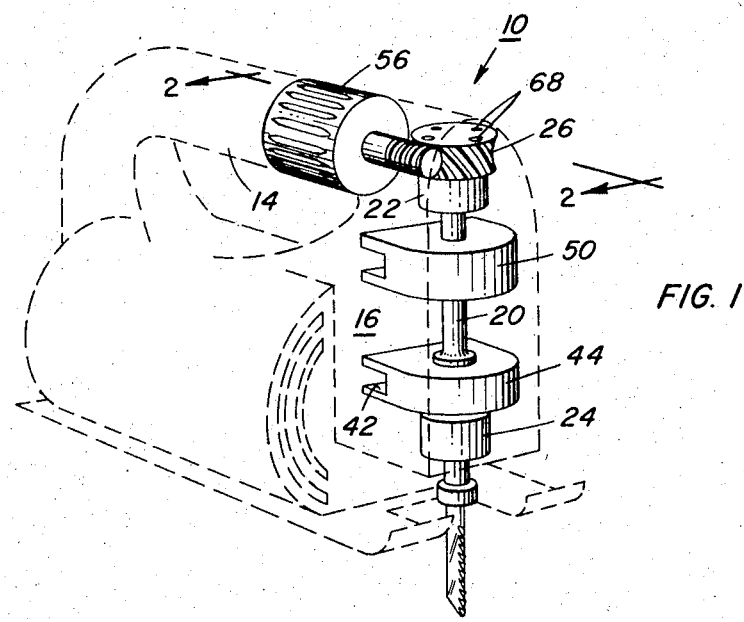
FIG. 1 is a perspective view, partly cut away of a preferred embodiment of the invention.

Referring now to the drawings, wherein like reference characters designate like or corresponding parts throughout the several views, there is shown in FIG. 1 a motor driven sabre saw 10 according to the present invention. The saw 10 comprises a motor housing 12 for containing a suitable motor of the conventional type, a handle 14 whereby an operator can both support and guide the saw 10, and a forward housing portion 16 wherein is mounted a blade driving mechanism 18.

Figure 2:
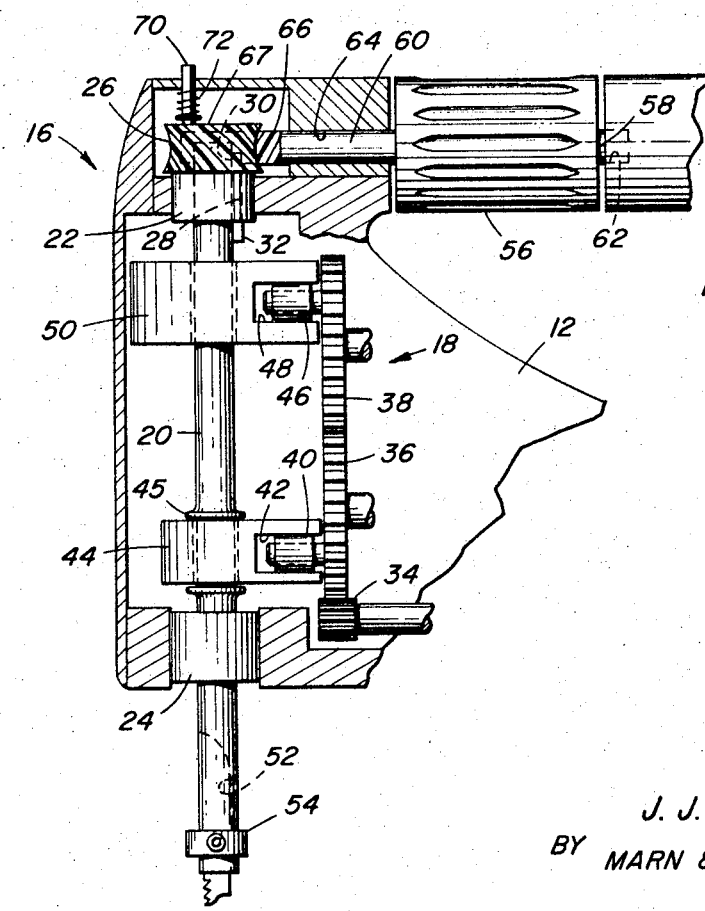
FIG. 2 is a sectional view of the device taken on the line 2—2 of FIG. 1.

As can be best seen in FIG. 2, the blade driving mechanism 18 comprises a shaft 20 mounted for reciprocable longitudinal movement in an upper bearing 22 and a lower bearing 24. The upper bearing 22 is mounted rotatably in the forward housing 16 and is secured against longitudinal movement therein. More specifically, upper bearing 22 is provided with an enlarged portion 26, formed integrally therewith or suitably fixedly secured thereto, which enlarged portion is received in an annular channel 30 formed in forward housing portion 16. The inner diameter of channel 30 is sufficiently larger that the diameter of enlarged portion 26 to permit free rotation of enlarged portion 26 therein. Further, upper bearing 22 is longitudinally restrained by the coaction of radial bearing walls 27 with the radial walls 31 of annular channel 30. The enlarged portion 26 of upper bearing 22 has spiral teeth formed around its peripheral surface for reasons which will be considered in detail hereinafter.

A pinion 34, driven by the motor mounted in motor housing 12, drives a first gear 36 which in turn drives a second gear 38. A roller 40 having an axis parallel to and radially displaced from the axis of gear 36 is attached normally to the face of first gear 36 and cooperates with a slot 42 in a driving disc 44 which is rotatably mounted on shaft 20 but secured against axial displacement by shoulders 45 or other suitable means such as spring rings. Rotation of gear 36 imparts a circular motion to roller 40 which, through the cooperation of roller 40 with slot 42 in driving disc 44, is translated into reciprocating motion thus driving the shaft 20 in longitudinal reciprocation.

Similarly, a roller 46, having an axis parallel to and radially displaced from the axis of gear 38 is attached normally to the face of second gear 38. Roller 46 cooperates with a slot 48 in a counterbalance 50 which is freely mounted coaxially on shaft 20 for unrestricted rotation and reciprocation with respect thereto. Rotation of gear 38 imparts a circular motion to roller 46 which, through the cooperation of roller 46 with slot 48 in counterbalance 50, is translated into longitudinally reciprocating motion. Gear 38 has a 1:1 ratio with respect to gear 36 and counterbalance 50 has a mass $M_1$ substantially equal to the effective mass $M_2$ of all the saw elements which reciprocate with shaft 20. It can be readily seen, therefore, that by reason of the engaged 1:1 gearing, counterbalance 50 travels in an opposite direction for the same stroke length as shaft 20 and since the masses $M_1$ and $M_2$ are substantially the same, the vibrating forces set up by the reciprocation of the shaft 20 are effectively cancelled thus affording relatively vibration free operation.

At the lower extremity of shaft 20 there is formed a slot 52 for receiving a sabre saw blade 53. Once a blade is placed in slot 52, it is secured by suitable clamping means such as the set-screw and collar 54 as seen in FIG. 2.

Referring now to FIGS. 1 and 2, it can be seen that handle 14 has a forward section 56 which is rotatably mounted by shafts 58 and 60 journalled respectively in holes 62 and 64 in the main portion of the handle 14. Shaft 60 has spiral teeth provided on the outer surface of its extreme end to define a control pinion 66 which meshes with the aforementioned spiral teeth on the enlarged portion 26 of upper shaft bearing 22. It can be seen, therefore, that during the operation of the sabre saw 10, an operator can rotate forward handle section 56 between the appropriate digits of his hand which is supporting sabre saw 10 by handle 14. Rotation of forward handle section 56 and therewith control pinion 66 causes the rotation of upper shaft bearing 22 which is keyed by keyway 30 and key 32 to shaft 20. The resultant rotation of shaft 20 about its longitudinal axis changes the angle of attack of the saw blade with respect to the major axis of the motor driven sabre saw 10 thereby allowing changes in direction of a cut without a corresponding manipulation of the entire motor driven saw and while the saw is in operation. Further, by being able to support the saw and vary the angle of attack of the blade with one hand, the operator is able to use his other hand to steady the workpiece during the cutting operation. It is of considerable significance that there is no limit to the amount of rotation that can be imparted to shaft 20.

The upper surface 67 of enlarged portion 26 of upper shaft bearing 22 has detents 68 formed therein. The detents may be selectively positioned to correspond to frequently used settings of the angle of attack of the saw blade. A locking pin 70, slidably mounted in housing portion 16, is urged into securing engagement with detents 68 by a spring 72 which surrounds the pin 70. Thus, during those cutting operations wherein the desired angle of attack of the saw blade corresponds to the position of one of the detents 68, the engagement of pin 70 in detent 68 prevents rotation of the saw blade about its longitudinal axis. In order to rotate the saw blade out of the secured positions, sufficient pressure must be exerted on the handle 56 to cam the locking pin 70 out of the detent 68 against the action of spring 72.

In FIG. 3, there is shown a second embodiment of th instant invention wherein the angle of attack of the sabre saw blade is varied by the manipulation of a wheel mounted above a blade driving mechanism 118. Thus there can be seen a portion of a motor driven sabre saw 110, including handle 114 and forward housing portion 116. As in the embodiment of FIGS. 1 and 2, blade supporting shaft 120 is longitudinally reciprocably mounted in an upper bearing 122 and lower bearing 124. Similar to the embodiment of FIGS. 1 and 2, the upper bearing 122 is mounted rotatably in the forward housing portion 116 and secured against longitudinal movement therein by the cooperation of enlarged bearing portion 126 with an annular channel formed in housing 116. Upper shaft bearing 122 has spiral teeth formed on the outer surface of enlarged portion 126 which cooperate with spiral teeth formed on a control pinion 166. Control pinion 166 is rotatably mounted in forward housing 116 and driven by a digitally operated wheel 168 mounted in the upper portion of forward housing 116 in such a manner as to allow a certain portion of the wheel 168 to extend through a slot 170 provided in a cover section 172. It can be seen, therefore, that during the operation of sabre saw 110, an operator can turn wheel 168 with the digits of his hand which is supporting sabre saw 110 by handle 114. Turning of wheel 168 causes rotation of control pinion 166 which in turn causes the rotation of upper shaft bushing 126 by reason of the intermeshed spiral gears. Shaft 120, keyed to upper shaft bushing 126, rotates therewith and thereby changes the angle of attack of the saw blade with respect to the major axis of the sabre saw 110. No locking pin provision has been shown in this embodiment, but it is to be recognized that one could easily be provided in the manner shown in the embodiment of FIGS. 1 and 2.

FIGS. 4 and 5 show still another embodiment of the instant invention wherein rotation of blade supporting shaft 220 is accomplished by turning a digitally operated wheel 268. In this embodiment, upper shaft bushing 226 is provided with linear teeth rather than the spiral teeth of the previous embodiments. Wheel 268 is rotatably mounted in the upper portion of forward housing 216 in such a manner as to allow successive peripheral portions of the wheel to extend through opposed slots formed in the housing 216 (best seen in FIG. 5). The axis of wheel 268 is parallel to the axis of shaft 220. Coaxially depending from wheel 268 and driven thereby is control pinion 266 which drives upper shaft bushing 226 through an idler gear 270. Thus, it can be seen that during the operation of sabre saw 210, an operator can turn wheel 268 with the thumb or fingers of his hand which is supporting the saw 210 by handle 214. Turning of wheel 268 causes rotation of control pinion 266 and therewith idler gear 270 and upper shaft bushing 226. Turning upper shaft bushing 226 causes a change in the angle of attack of the saw blade in the same manner described with respect to the embodiment of FIGS. 1 and 3. Again, it is to be recognized that locking pins may be utilized in this embodiment, if so desired, and in the manner disclosed with respect to the embodiment of FIG. 1.

Only the various shaft turning devices have been described with respect to the embodiment of FIGS. 3 and 4 since the shaft driving mechanisms and the rest of the power saw assembly can be exactly the same as the embodiment of FIGS. 1 and 2.

Obviously, numerous modifications and variations of the present invention are possible in the light of the above teachings. It is therefore to be understood that within the scope of the appended claims the invention may be practiced otherwise than as specifically described therein.

What is claimed:
1. A sabre saw comprising:
a housing having a handle thereon;
motive means mounted within said housing;
a shaft reciprocably mounted within said housing and adapted to carry a saw blade on one end for cutting a workpiece;
means connecting said shaft to said motive means whereby the operation of said motive means imparts a longitudinal reciprocating motion to said shaft;
gear means mounted on said shaft at the end opposite the end for mounting said saw blade;
pinion means mounted in operative relationship with said gear means; and
means for rotating said pinion means to rotate said shaft about its longitudinal axis to vary the angle of attack of said saw blade with respect to said workpiece during the operation of said sabre saw, said means for rotating including means for engagement by the hand of an operator, said means for engagement being positioned in such proximity with respect to said handle that said saw may be supported and said pinion rotated by the use of only said hand of said operator.

2. The sabre saw of claim 1 wherein said means for rotating said pinion comprises a section of said handle, rotatably mounted with respect to the major portion of said handle.

3. The sabre saw of claim 1 wherein said means for rotating said pinion comprises a wheel mounted for rotation about an axis normal to said longitudinal axis.

4. The sabre saw of claim 1 wherein said means for rotating said pinion comprises a wheel mounted for rotation about an axis parallel to said longitudinal axis.

References Cited

UNITED STATES PATENTS

| | | | |
|---|---|---|---|
| 2,490,281 | 12/1949 | Rose | 143—74 |
| 2,547,922 | 4/1951 | Bechtold | 143—68 |
| 2,588,477 | 3/1952 | Briggs | 143—68 |
| 3,205,722 | 9/1965 | Happe | 143—68 |

FOREIGN PATENTS 458,715  4/1928  Germany.

DONALD R. SCHRAN, *Primary Examiner.*

U.S. Cl. X.R.

30—272